United States Patent
Peng et al.

(10) Patent No.: US 7,783,261 B2
(45) Date of Patent: Aug. 24, 2010

(54) METHOD FOR WIRED CONNECTION MEASURING THE STANDBY TIME OF A CDMA MOBILE TERMINAL

(75) Inventors: Hongli Peng, Shenzhen (CN); Jianjiang Chen, Shenzhen (CN); Biqin Tu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 227 days.

(21) Appl. No.: 11/658,438

(22) PCT Filed: Feb. 25, 2005

(86) PCT No.: PCT/CN2005/000229

§ 371 (c)(1), (2), (4) Date: Sep. 18, 2008

(87) PCT Pub. No.: WO2006/010303

PCT Pub. Date: Feb. 2, 2006

(65) Prior Publication Data

US 2009/0011712 A1    Jan. 8, 2009

(30) Foreign Application Priority Data

Jul. 27, 2004   (CN) .................... 2004 1 0050881

(51) Int. Cl.
*H04B 17/00* (2006.01)

(52) U.S. Cl. ............... 455/67.11; 455/67.14; 455/423; 455/434; 455/452.1; 455/522; 455/574; 455/552.1; 370/342; 370/320; 370/311; 370/335

(58) Field of Classification Search ............... 455/574, 455/67.11, 67.14, 423, 424, 435.1, 552.1, 455/434, 522, 452.1; 370/342, 311, 335
See application file for complete search history.

(56) References Cited

U.S. PATENT DOCUMENTS

| | | | |
|---|---|---|---|
| 5,381,350 A | | 1/1995 | Fiorina et al. |
| 5,870,685 A | * | 2/1999 | Flynn .......................... 455/573 |
| 6,041,241 A | * | 3/2000 | Willey ........................ 455/574 |
| 6,087,808 A | | 7/2000 | Pritchard |
| 6,243,561 B1 | * | 6/2001 | Butler et al. ................ 340/7.42 |
| 6,463,305 B1 | * | 10/2002 | Crane .......................... 455/566 |
| 6,684,083 B1 | * | 1/2004 | Harimoto .................. 455/556.1 |
| 6,748,010 B1 | * | 6/2004 | Butler et al. ................ 375/148 |

(Continued)

FOREIGN PATENT DOCUMENTS

CN    1083595    3/1994

(Continued)

OTHER PUBLICATIONS

International Search Report for International Publication PCT/CN2005/000229 dated Jun. 2, 2005.

(Continued)

*Primary Examiner*—Marceau Milord

(57) ABSTRACT

A method of wired connection measuring the standby time of a CDMA mobile terminal, connects the CDMA mobile terminal with network emulator, and places them in the network test environment, then measures the standby current, voltage and electric quantity at standby time of the mobile terminal, thereby calculates the standby time of the mobile terminal. This method needs low test environment, and testing is simple and rapidly.

8 Claims, 2 Drawing Sheets

U.S. PATENT DOCUMENTS

| | | | |
|---|---|---|---|
| 6,898,438 B1* | 5/2005 | Uchida | 455/522 |
| 6,904,282 B2* | 6/2005 | Cooper | 455/434 |
| 7,006,468 B1* | 2/2006 | Chen et al. | 370/330 |
| 7,113,810 B2* | 9/2006 | Kim | 455/574 |
| 7,142,896 B2* | 11/2006 | Lee | 455/574 |
| 7,177,600 B2* | 2/2007 | Kang et al. | 455/67.11 |
| 7,536,451 B2* | 5/2009 | Ahn et al. | 709/223 |
| 2004/0204174 A1* | 10/2004 | Pehrsson | 455/572 |
| 2006/0141998 A1* | 6/2006 | Kennedy et al. | 455/423 |

FOREIGN PATENT DOCUMENTS

| | | |
|---|---|---|
| CN | 1348544 | 5/2002 |

OTHER PUBLICATIONS

Li Hang, "Measurement and Improvement of Standby Time and Standby Current Index in Mobile Telephone" Mobile Communication. vol. 5, pp. 42-44 (2002).

* cited by examiner

METHOD FOR WIRED CONNECTION MEASURING THE STANDBY TIME OF A CDMA MOBILE TERMINAL

FIELD OF THE INVENTION

The present invention relates to mobile communication field, and specially, to a method for measuring the standby time of Code Division Multiple Access (CDMA) mobile terminal.

BACKGROUND ART

With the fast increase of the number of the users who use CDMA network of China Unicom, the problem reported by the terminal users that the standby time and call time of CDMA terminals are relatively short becomes increasingly prominent. Hence, China Unicom made a special research in the hope of finding the basic reason that CDMA terminal consumes too much electric power so as to produce a solution for network optimization and terminal improvement. However, description parameters for simply, economically, and rapidly evaluating the power consuming time of the CDMA terminal in network environment and the technology for measuring the description parameters are still blank.

SUMMARY OF THE INVENTION

One object of the present invention is to provide a method for wired connection measuring the standby time of a CDMA mobile terminal, and the method can simply and rapidly evaluate the description parameters of the power consuming time of a CDMA mobile terminal in emulation network environment and measure the description parameters.

In order to achieve the above invention object, the present invention provides a method for wired connection measuring the standby time of a CDMA mobile terminal, and the method comprises the following steps:

step 1, creating test environment emulating CDMA network and wired connection measuring condition.

In the step, creating the test environment further comprises the following steps:
1. placing a hand phone to be measured and a network emulator in a specified environment which is shielded from outer electromagnetic wave;
2. placing the hand phone to be measured on a test table made from electromagnetic loss materials;
3. connecting the radio frequency port of the hand phone to be measured with one end of a radio frequency cable of low power consumption whose loss is known, and connecting the other end of the radio frequency cable of low power consumption to the CDMA network emulator;
4. setting the mobile terminal to be measured in standby state.

During creating the above test environment, qualified original battery is used for the mobile terminal to be measured. A method for creating the environment can further comprise any one of the following steps: if the mobile terminal is a flip hand phone, opening the upper flip to the most extent; or setting the backlight of the mobile terminal to be measured in closed state or in darkest state; or the mobile terminal to be measured is perpendicular to the test table made from of the low electromagnetic loss materials.

Step 2, measuring the standby current, voltage, and electric quantity during the standby time of the mobile terminal;

the step further comprises the following steps:
1. using external constant voltage power supply as the power supply of the mobile terminal to be measured;
2. setting the mobile terminal in standby work mode, and keeping for $\Delta T_{Idle}$ time period;
3. obtaining average standby current $\hat{I}_{Idle}$ during the $\Delta T_{Idle}$ time period by measuring and calculating;
4. charging the original real battery of the mobile terminal fully with its charger, and then fully discharging at 0.5 C at a battery tester;
5. recharging the real battery fully with the charger; and
6. mounting the fully charged real battery on the battery tester, and discharging at a constant current $I_{0,Idle}$ till automatic power off voltage $V_t$ of the mobile terminal to be measured is reached, recording discharging time as $T_{0,Idle}$ then the total discharge of the battery is $I_{0,Idle} \cdot T_{0,Idle}$.

Step 3, calculating the standby time $T_{Idle}$ according to the parameters measured in step 2.

This step can further comprise the following step: calculating the standby time according to the equation for measuring the standby time $$T_{Idle}, \text{ i.e. } T_{Idle} = \frac{I_{0,Idle}}{\hat{I}_{Idle}} \cdot T_{0,Idle}.$$

In the present invention, the method for evaluating the standby time of the CDMA mobile terminal in emulating network environment by creating test environment and wired connection measuring condition, measuring average standby current, voltage, and electric quantity during the standby time of a CDMA mobile terminal, and calculating the standby time according to the measured parameters needs low test environment and is simple.

EMBODIMENTS FOR CARRYING OUT THE INVENTION

The present invention will be further described in detail in connection with the drawings and embodiment for measuring the hand phone.

The present embodiment is a method for wired connection measuring the standby time of a CDMA hand phone, and the basic idea of the method is as follows: treat the hand phone to be measured as a black box, that is, it does not relate to the inner specific work processes of the hand phone, and then define the test environment of the hand phone including the position for placing the test system. According to the method of the present invention, connect the radio frequency port of the hand phone to be measured (also referred to as terminal connection interface or antenna interface, and hereinafter the same) with one end of the defined radio frequency cable of low power consumption, connect the other end of the radio frequency cable of low power consumption to the CDMA network emulator (also referred to as a CDMA base station emulator or a terminal tester), and create CDMA communication links. Then measure the average standby current, voltage, and the total discharge of the hand phone to be measured in the present environment, and finally calculate the standby time of the hand phone.

Figure 1:
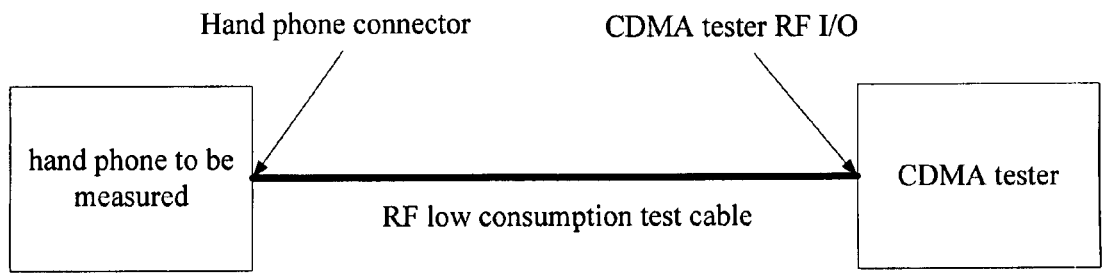
FIG. 1 is a schematic view of wired connection measurement of the measuring method in the present invention.

FIG. 1 shows that the connection interface connecting to the RF I/O of CDMA network emulator via the RF cable of low power consumption; setting CDMA network emulator to keep in paging state; starts paging to enter the standby state by the hand phone to be measured, thereby finishing setup of the communication link of the present invention.

Figure 2:
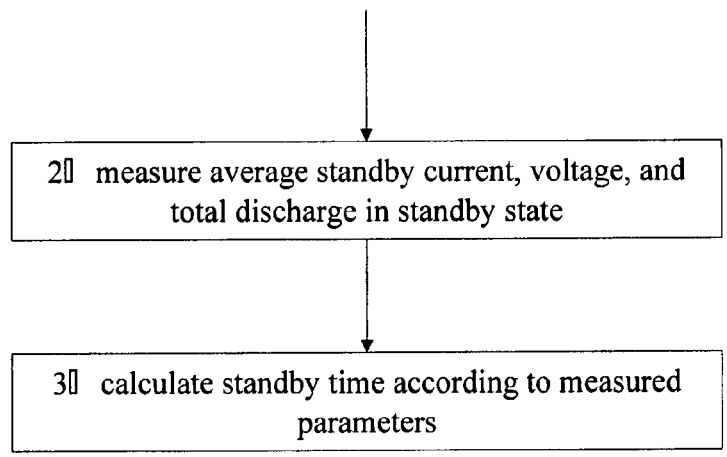
FIG. 2 is a schematic view of main test flows of the measuring method in the present invention.

FIG. 2 is a schematic view of the main test flows of the measuring method in the present invention.

According to the measuring method of the present invention, measuring the standby time comprises the following steps:
1. create test environment emulating CDMA network and wired connection measuring condition of the hand phone to be measured and the network emulator;
2. measure the average current, voltage and the total discharge of the hand phone to be measured in standby work mode; and
3. calculate the standby time of the hand phone to be measured.

Figure 3:
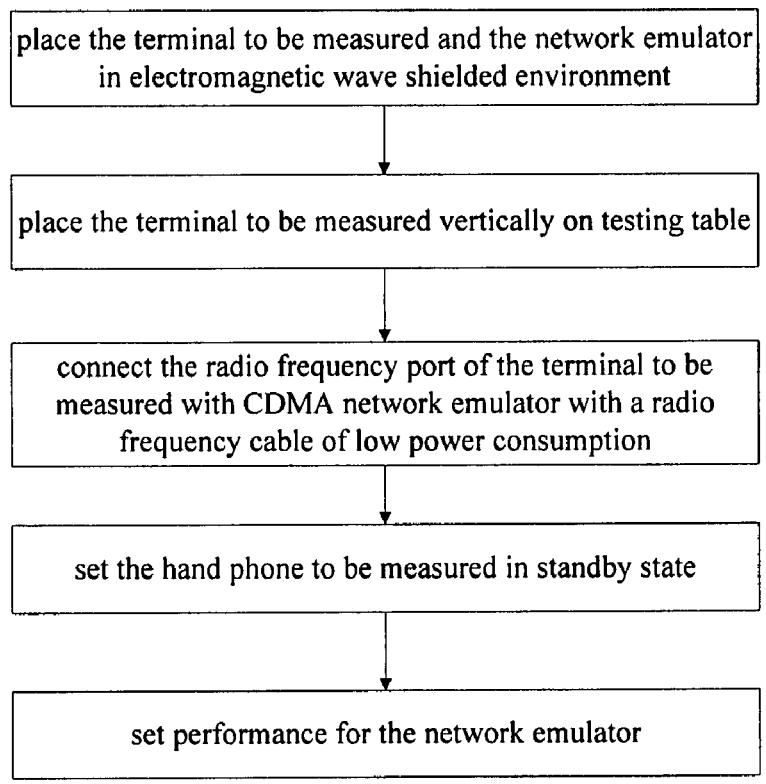
FIG. 3 is a test flow view of creating wired connection measuring condition in the measuring method in the present invention.

FIG. 3 is a flow view of creating wired connection measuring condition and test environment according to the measuring method of the present invention.

According to the measuring method of the present invention, creating wired connection measuring condition and test environment comprises the following steps:
1. place the hand phone to be measured and the network emulator in a specified environment which is shielded from outer electromagnetic wave, and the electromagnetic wave shielded enclosure is about 3 m*3 m*2.7 m.
2. place the hand phone to be measured vertically on the test table made from the low electromagnetic loss materials;
3. connect the radio frequency port of the hand phone to be measured with one end of a radio frequency cable of low power consumption whose loss is known, and connect the other end of the radio frequency cable of low power consumption to the CDMA network emulator, and the connecting state is shown in FIG. 1, the length of the RF connection cable of low power consumption capable of high frequency choke is about 0.5 m.
4. set the hand phone to be measured in standby work state; and in the case of a flip hand phone, open the upper flip to the most extent;
5. performance calibration of the network emulator should conform with relevant test regulations.
6. use original and qualified battery for the hand phone to be measured which has not been used more than six months.
7. set a external fixed audio frequency device with audio frequency;
8. set the backlight of the hand phone to be measured in closed state or in darkest state.

Figure 4:
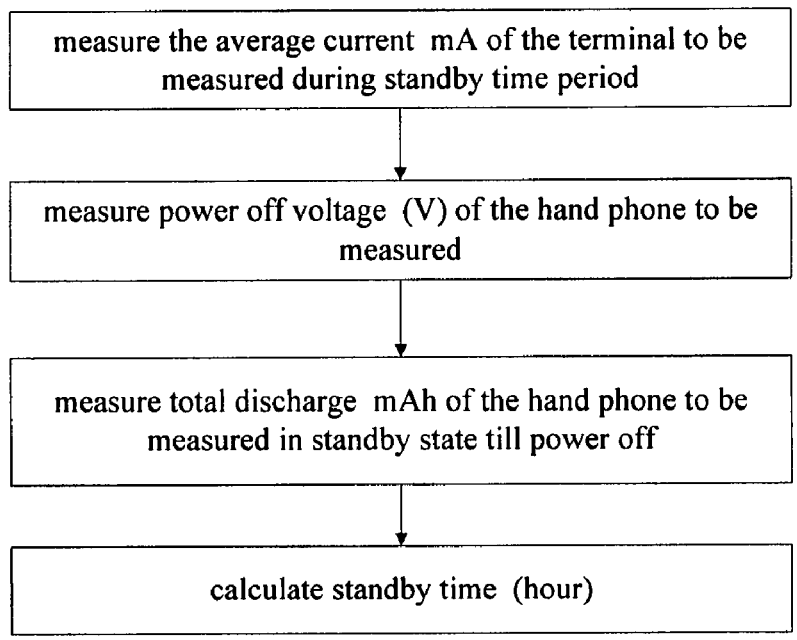
FIG. 4 is a test flow view of measuring the standby time in the measuring method in the present invention.

FIG. 4 is a flow view of measuring the standby time according to the measuring method of the present invention.

According to the measuring method of the present invention, measuring the standby time of the hand phone comprises the following steps:
1. create wired connection measuring condition as shown in FIG. 1:
   (1) use external constant current power supply connected with a ammeter as the power supply of the hand phone to be measured; and
   (2) connect the hand phone to be measured with the network emulator through the RF cable of low power consumption.
2. measure the average standby current $I_{Idle}$ of the hand phone:
   (1) set the mobile terminal in standby work mode, and keep for $\Delta T_{Idle}$ hour;
   (2) calculate the average standby current $I_{Idle}$ during $\Delta T_{Idle}$ time period according to the actually measured current.
3. measure the power off voltage $V_t$ (V) of the hand phone to be measured, which conducts test automatically according to a certain search algorithm.
4. measure the total discharge of the original battery of the hand phone to be measured till the power off voltage $V_t$ is reached:
   (1) use the charger of the hand phone to be measured to fully charge the original battery of the hand phone, and then fully discharge at 0.5 C on the battery tester;
   (2) recharge the real battery fully with the charger;
   (3) mount the fully charged battery of the hand phone to be measured on the battery tester, and discharge at constant current $I_{0,Idle}$ till the power off voltage $V_t$ is reached, and record the discharging time as $T_{0,Idle}$, then the total discharge of the battery is $I_{0,Idle} \cdot T_{0,Idle}$; and
   (4) calculate the standby time $T_{Idle}$, and $$T_{Idle} = \frac{I_{0,Idle}}{I_{Idle}} \cdot T_{0,Idle}.$$

Typical parameter values of the standby measuring method as shown in the following table:

| | Standby time $\Delta T_{Idle}$ (hour) | Power off voltage $V_t$ (V) | Constant discharging current $I_{0,\,Idle}$ (mA) |
| --- | --- | --- | --- |
| Typical value | 0.5 | 3.2 | 100 |

Please note: C refers to the total electric quantity of the battery. For example, C=400 mAh, then in $3^{rd}$, the discharging current=0.5 C=200 mA.

The present technical solution can be used for, but not limited to, the mobile terminal based on the technology of CDMA, that is, the main steps can also be used for a GSM mobile terminal and a PHS mobile terminal.

A preferred embodiment of the present invention is above-described, which cannot be understood as limitation on the protection scope required by the present application, and the protection scope should be determined on the basis of the claims enclosed hereinafter.

What is claimed is:
1. A method for wired connection measuring standby time of a CDMA mobile terminal, comprising:
   a) creating a test environment emulating CDMA network and a wired connection measuring condition, wherein the mobile terminal is connected to a network emulator via a wired connection, the network emulator being a base station emulator;

b) measuring an average standby current, a voltage, and an electric quantity at a standby time period of the mobile terminal; and c) calculating the standby time period $T_{Idle}$ according to parameters of the mobile terminal measured in step b), wherein in the step c), the equation for measuring standby time $T_{Idle}$ is:

$$T_{Idle} = \frac{I_{0,Idle}}{I_{Idle}} \cdot T_{0,Idle}.$$

2. The method for wired connection measuring standby time of a CDMA mobile terminal according to claim 1, wherein the step a) further comprises the following steps:
   1) placing the mobile terminal to be measured and the network emulator in a specified environment which is shielded from outer electromagnetic wave;
   2) placing the mobile terminal to be measured on a test table made from low electromagnetic loss materials;
   3) connecting the radio frequency port of the mobile terminal to be measured with one end of a radio frequency cable of low power consumption whose loss is known, and connecting the other end of the radio frequency cable of low power consumption to the network emulator; and
   4) setting the mobile terminal to be measured in a standby work state.

3. The method for wired connection measuring standby time of a CDMA mobile terminal according to claim 2, wherein, in the step 4), if the mobile terminal to be measured is a flip CDMA hand phone, opening its upper flip to the most extent.

4. The method for wired connection measuring standby time of a CDMA mobile terminal according to claim 2, wherein, the mobile terminal to be measured is equipped with qualified battery of the mobile terminal.

5. The method for wired connection measuring standby time of a CDMA mobile terminal according to claim 2, wherein, if the mobile terminal to be measured is a CDMA hand phone, setting the backlight of the hand phone to be measured in closed state or in the darkest state.

6. The method for wired connection measuring standby time of a CDMA mobile terminal according to claim 2, wherein, placing the CDMA mobile terminal to be measured vertically on the test table made from the low electromagnetic loss materials.

7. The method for wired connection measuring standby time of a CDMA mobile terminal according to claim 1, wherein the step b) further comprises the following steps:
   1) using an external constant voltage power supply as power supply for the mobile terminal to be measured;
   2) setting the mobile terminal in standby work mode and keeping it for $\Delta T_{Idle}$ time period;
   3) obtaining average standby current $i_{Idle}$ during $\Delta T_{Idle}$ time period by measuring and calculating.

8. The method for wired connection measuring standby time of a CDMA mobile terminal according to claim 1, wherein the step b) further comprises the following steps:
   1) using a charger of the mobile terminal to be measured to fully charge the qualified battery, and then fully discharging at 0.5 C on a battery tester;
   2) recharging the real battery fully with the charger;
   3) mounting the fully charged real battery on the battery tester, and discharging at constant current $I_{0,Idle}$ till automatic power off voltage $V_t$ of the mobile terminal to be measured is reached, and recording discharging time as $T_{0,Idle}$, then the total discharge of the battery can be $I_{0,Idle} \cdot T_{0,Idle}$.

* * * * *